US007216739B2

(12) United States Patent
Sterling

(10) Patent No.: US 7,216,739 B2
(45) Date of Patent: May 15, 2007

(54) MUFFLER FOR PNEUMATIC HAND TOOL

(75) Inventor: Robert E Sterling, Colbert, WA (US)

(73) Assignee: Exhaust Technologies, Inc., Spokane, WA (US)

( * ) Notice: Subject to any disclaimer, the term of this patent is extended or adjusted under 35 U.S.C. 154(b) by 224 days.

(21) Appl. No.: 11/021,271

(22) Filed: Dec. 23, 2004

(65) Prior Publication Data
US 2005/0103566 A1 May 19, 2005

Related U.S. Application Data

(63) Continuation-in-part of application No. 10/675,151, filed on Sep. 29, 2003, now Pat. No. 6,926,117, which is a continuation-in-part of application No. 09/825,384, filed on Apr. 2, 2001, now Pat. No. 6,668,971, which is a continuation-in-part of application No. 09/431,294, filed on Oct. 29, 1999, now Pat. No. 6,209,678, which is a continuation-in-part of application No. 09/316,451, filed on May 21, 1999, now abandoned, which is a continuation of application No. 09/082,293, filed on May 19, 1998, now Pat. No. 5,909,016, which is a continuation-in-part of application No. 08/999,588, filed on Jan. 13, 1998, now Pat. No. 5,952,623.

(51) Int. Cl.
F01N 1/10 (2006.01)
F01N 1/24 (2006.01)
F01N 1/08 (2006.01)

(52) U.S. Cl. ............... 181/230; 181/252; 181/256; 173/DIG. 2

(58) Field of Classification Search ........ 181/230, 181/252, 256, 258; 173/DIG. 2
See application file for complete search history.

(56) References Cited

U.S. PATENT DOCUMENTS 3,032,139 A * 5/1962 Gildone .................. 181/252
3,142,354 A * 7/1964 Helmut .................. 181/252
3,163,255 A * 12/1964 Stryker .................. 181/230
3,384,200 A * 5/1968 Baker et al. ............. 181/230

(Continued)

FOREIGN PATENT DOCUMENTS

EP         0 084 598 A1    8/1983

(Continued)

Primary Examiner—Edgardo San Martin
(74) Attorney, Agent, or Firm—Christensen O'Connor Johnson Kindness PLLC

(57) ABSTRACT

A pneumatic tool (610) and a muffler assembly (600) therefor, for quieting the operation of the pneumatic tool, are disclosed. In one embodiment, the muffler assembly (600) is slidably disposed within the exhaust passage (616) and includes a tube member (602) having a proximal flange (604), an intermediate tubular portion (606) with apertures (608), and a distal receptacle (620). The tubular portion may include a blocking plate (618) therein. A porous, sound-deadening panel (622) is disposed about the tubular portion, and a diffuser panel (630) is disposed in the distal receptacle. A perforated end cap (624) holds the muffler assembly in place. In operation, the exhaust enters the tube member, is directed transversely through apertures in the tubular portion and through the porous panel, then back into the distal portion of the tube member, through the diffuser panel, and exits through the end cap.

21 Claims, 8 Drawing Sheets

U.S. PATENT DOCUMENTS

| | | | |
|---|---|---|---|
| 3,526,293 A | 9/1970 | Hayes et al. | |
| 3,545,565 A * | 12/1970 | McCaffrey Jr. | 181/256 |
| 3,561,561 A * | 2/1971 | Trainor | 181/267 |
| 3,667,571 A | 6/1972 | Fattelay | |
| 3,672,465 A * | 6/1972 | Blatt et al. | 181/258 |
| 3,675,732 A | 7/1972 | Rosen et al. | |
| 3,710,891 A * | 1/1973 | Flugger | 181/256 |
| 3,719,251 A | 3/1973 | Fedrick | |
| 3,811,251 A | 5/1974 | Gibel | |
| 3,823,795 A * | 7/1974 | Fleigle | 181/230 |
| 3,842,932 A | 10/1974 | Gibel | |
| 3,880,245 A | 4/1975 | Anderson, Jr. | |
| 3,880,252 A | 4/1975 | Mucka | |
| 3,896,897 A | 7/1975 | Hillbush, Jr. | |
| 3,949,828 A * | 4/1976 | Frochaux | 181/230 |
| 3,981,377 A * | 9/1976 | Gilberto | 181/230 |
| 4,033,428 A | 7/1977 | Wennerstrom | |
| 4,082,160 A | 4/1978 | Schilling et al. | |
| 4,134,472 A | 1/1979 | Trainor | |
| 4,184,564 A | 1/1980 | Trainor | |
| 4,205,732 A | 6/1980 | Auerbach et al. | |
| 4,258,798 A | 3/1981 | Campbell et al. | |
| 4,367,807 A | 1/1983 | Fink et al. | |
| 4,565,259 A | 1/1986 | Stoll | |
| 4,749,058 A * | 6/1988 | Trainor | 181/239 |
| 4,778,015 A * | 10/1988 | Jacobsson | 173/169 |
| 5,036,948 A * | 8/1991 | Henn | 181/258 |
| 5,097,924 A | 3/1992 | Reeves | |
| 5,355,673 A | 10/1994 | Sterling et al. | |
| 5,418,339 A | 5/1995 | Bowen et al. | |
| 5,500,494 A | 3/1996 | Ligman | |
| 5,581,055 A | 12/1996 | Self et al. | |
| 5,731,556 A | 3/1998 | Gardner et al. | |
| 5,767,459 A | 6/1998 | Sell | |
| 5,847,334 A | 12/1998 | Taga | |
| 5,892,186 A * | 4/1999 | Flugger | 181/252 |
| 5,909,016 A | 6/1999 | Sterling | |
| 5,952,623 A | 9/1999 | Sterling | |
| D432,891 S | 10/2000 | Sterling | |
| 6,209,678 B1 | 4/2001 | Sterling | |
| 6,425,412 B2 | 7/2002 | Sterling | |
| 6,543,549 B1 * | 4/2003 | Riedl et al. | 173/216 |
| 6,640,927 B1 * | 11/2003 | Turner | 181/252 |
| 6,668,971 B2 * | 12/2003 | Sterling | 181/230 |
| 6,751,952 B2 * | 6/2004 | Chen | 60/407 |
| 6,923,272 B2 * | 8/2005 | Jansson et al. | 173/169 |
| 6,926,117 B2 * | 8/2005 | Sterling | 181/230 |
| 6,991,043 B1 * | 1/2006 | Chen | 173/169 |

FOREIGN PATENT DOCUMENTS

| | | |
|---|---|---|
| EP | 0 127 550 A2 | 12/1984 |
| FR | 1 519 853 A | 4/1968 |
| FR | 2 570 759 | 3/1986 |
| GB | 1 432 048 | 4/1976 |
| TW | 417559 | 1/2001 |

* cited by examiner

MUFFLER FOR PNEUMATIC HAND TOOL

CROSS-REFERENCES TO RELATED APPLICATIONS

This application is a continuation-in-part of U.S. application Ser. No. 10/675,151, filed Sep. 29, 2003, now U.S. Pat. No. 6,926,117 which is a continuation-in-part of U.S. application Ser. No. 09/825,384, filed Apr. 2, 2001, now U.S. Pat. No. 6,668,971, which is a continuation-in-part of U.S. application Ser. No. 09/431,294, filed Oct. 29, 1999, now U.S. Pat. No. 6,209,678, which is a continuation-in-part of U.S. application Ser. No. 09/316,451, filed May 21, 1999, now abandoned, which is a continuation of U.S. application Ser. No. 09/082,293, filed May 19, 1998, now U.S. Pat. No. 5,909,016, which is a continuation-in-part of U.S. application Ser. No. 08/999,588, filed Jan. 13, 1998, now U.S. Pat. No. 5,952,623, all of which are hereby incorporated by reference.

FIELD OF THE INVENTION

The present invention relates to a compressed air muffler and, more particularly, to devices for muffling and filtering air exhausted from pneumatically operated hand tools, equipment, machines, and the like.

BACKGROUND OF THE INVENTION

Pneumatic hand tools are commonly used in industrial and residential settings. Various types of pneumatic hand tools are available, including ratchets, drills, wrenches, grinders, sanders, etc. Known hand tools typically include a handle having a hollow internal chamber. The chamber includes an air intake passage and an air exhaust passage. Each passage extends between a motor and an opening in or near the bottom surface of the handle. The portion of the intake passage located near the handle opening typically includes a standard air coupler or the like. The coupler is adapted to connect to a pressurized air source. The exhaust passage typically opens to the atmosphere. When exhaust air is vented from the hand tool, a considerable amount of noise and particulate debris are generated, potentially causing auditory and/or respiratory damage to the operator and others located nearby.

Although earplugs and facemasks are available to workers, they are often not used for a number of reasons—most typically, because they are not convenient. Numerous attempts have been made by hand tool manufacturers, therefore, to reduce the amount of noise and particles generated by the hand tool itself. These attempts include designing quieter and cleaner motors and designing hand tool components that suppress noise and trap waste prior to expulsion from the hand tool. For example, U.S. Pat. No. 5,418,339 describes a pneumatic hand tool having an exhaust port filled with a web of nonwoven fibers coated with a binder resin. These types of mufflers have had some success in muffling sound, but there is often an increase in back pressure to the motor, causing a decrease in the operating efficiency of the hand tool. The operating efficiency of a tool is typically measured in the operating speed of the motor in revolutions per minute (rpm) at a certain gauge pressure.

Cylindrical, canister-type combination muffler and air filters are known for large machines, such as hoists and presses. For example, U.S. Pat. No. 4,134,472 describes a combination muffler and air filter having a central tubular member with a number of slots. The tubular member is surrounded by a disposable canister having inner and outer perforated rigid cylinders encasing a series of stacked annular filter members. Exhaust air passes through the inner cylinder into the filters and out the outer cylinder. These devices are not typically used for hand tools, however, because they are large, heavy, and difficult to maneuver.

Thus there exists a need for a noise muffling system that can reduce sound levels and remove entrained solid and liquid contaminates from the exhausted air before it is discharged to the atmosphere. The ideal device would effectively muffle and filter the exhaust air without causing an undue increase in back pressure. This would allow a hand tool to be operated without jeopardizing performance of the pneumatic tool over long periods of usage. The ideal muffling system would further attach to and/or be inserted into a hand tool body and remain attached even during significant tool vibrations. The present invention is directed to fulfilling these needs and others as described below.

SUMMARY OF THE INVENTION

In accordance with aspects of the present invention, a pneumatic hand tool and a muffler therefor, for quieting exhaust expelled from the pneumatic hand tool, are provided. The pneumatic hand tool includes a handle portion with an exhaust passage including an elongate channel having an open end. A tube member is sized to be insertable into the exhaust passage through the open end, the tube member having a proximal flange, an intermediate tubular portion with a plurality of apertures therethrough, and a distal end defining a receptacle. The tube member may be formed integrally from a semirigid polymeric material. A first porous panel is disposed about the intermediate tubular portion of the tube member over the apertures. A second porous panel is disposed in the receptacle, and an end cap having at least one aperture therethrough is removably attached to the handle portion such that the tube member is retained in the exhaust passage.

In an embodiment of the invention, the tubular portion of the tube member includes a transverse blocking plate, such that exhaust entering at the top end tubular portion is redirected through the apertures in the tubular portion and through the first porous panel.

In an embodiment of the invention, the first porous panel is a flexible felt sheet that is wrapped around the perforated portion of the tube.

In an embodiment of the invention, the apertures through the tubular portion of the tube member are elongate circumferential apertures.

In an embodiment of the invention, the second porous panel is formed from a spacer fabric that is removably insertable into the receptacle.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is a muffler for use in quieting exhaust expelled from a pneumatic hand tool. The present invention is compact, lightweight, and easy to use. In select embodiments, the muffler is adapted for immediate connection to known pneumatic hand tools, with only minimal changes required to the hand tools. A number of embodiments of the present invention are described below with reference to the accompanying drawings. It should be appreciated that these embodiments are provided to illustrate various features of the present invention and thus should not be viewed as limiting with regard to the specific combination of their configurations.

Figure 1:
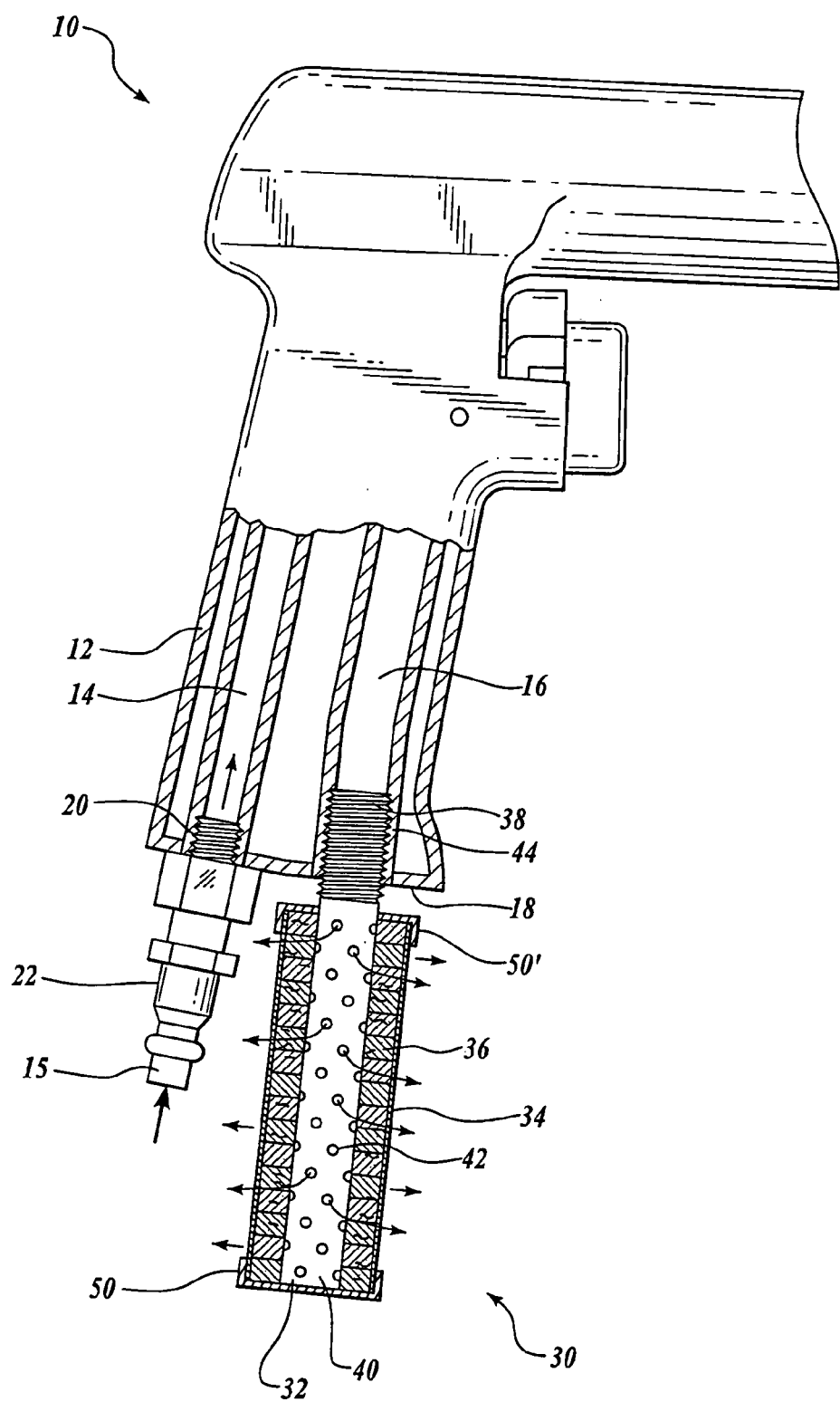
FIG. 1 is a partial cross-sectional side view of a first embodiment of a muffler formed in accordance with the present invention.

Referring to FIG. 1, a pneumatic hand tool 10 generally includes a handle 12 within which an air intake passage 14 and an air exhaust passage 16 extend to openings in the bottom surface 18 of the handle 12. The air intake passage 14 opening includes threads 20 adapted to connect to an air supply line 15 via a standard air coupler 22 or the like. The supply line 15 is in communication with a pressured air supply source (not shown.) A muffler formed in accordance with the present invention connects to the exhaust passage 16 using any one of a number of means, depending on the handle configuration of the tool.

Shown in FIG. 1 is a first embodiment of a muffler 30 formed in accordance with the present invention. FIG. 1 is a partial cutaway drawing. The muffler 30 includes an inner tube 32 having proximal end 38 and distal end 40, an outer sleeve or tube 34, and a number of washers 36. In FIG. 1, the inner tube 32 is shown in side view, not cross-section. Each washer 36 (shown in cross-section) is preferably annular with a centered circular inner hole. The inner tube 32 is positioned within the area defined by the stacked washer 36 inner holes. The inner tube 32 is formed from a relatively lightweight rigid material, e.g., plastic, metal alloys, steel, etc. The inner tube 32 includes a plurality of holes 42 distributed about the inner tube 32 along its longitudinal length. In the embodiment of FIG. 1, the inner tube proximal end 38 includes outer threads 44 adapted to screw into corresponding threads formed in the exhaust passage 16 near the exhaust opening. Other known attachment means, however, may be used, e.g., adhesive, latches, clamps, snaps, bolts, crosspins, etc.

Still referring to FIG. 1, the washers 36 are similarly sized to one another and are stacked such that their inner holes are aligned. The inner tube 32 is located within the area defined by the aligned washer holes. The stack of washers 36 extends generally along the portion of the length of the inner tube 32 for which there are holes 42. The washers 36 are made of a suitable sound-dampening and/or air-filtering material, such as felt, gauze, rubber, foam, fiber, synthetics, etc. The washers 36 should be of a density sufficient to dampen noise, but not dense enough to cause a significant backpressure in the exhaust passage 16. An exemplary, high-density felt washer that has yielded good results is manufactured by All Felt Products of Engleside, Ill., product number F-1 S.A.E. During testing, this washer decreased the noise level by approximately 15 decibels, while causing a backpressure of less than about 2.5 psi, as measured in a standard pneumatic hand tool. In addition, the washers preferably include mold- and moisture-resisting chemicals.

Figure 2A:
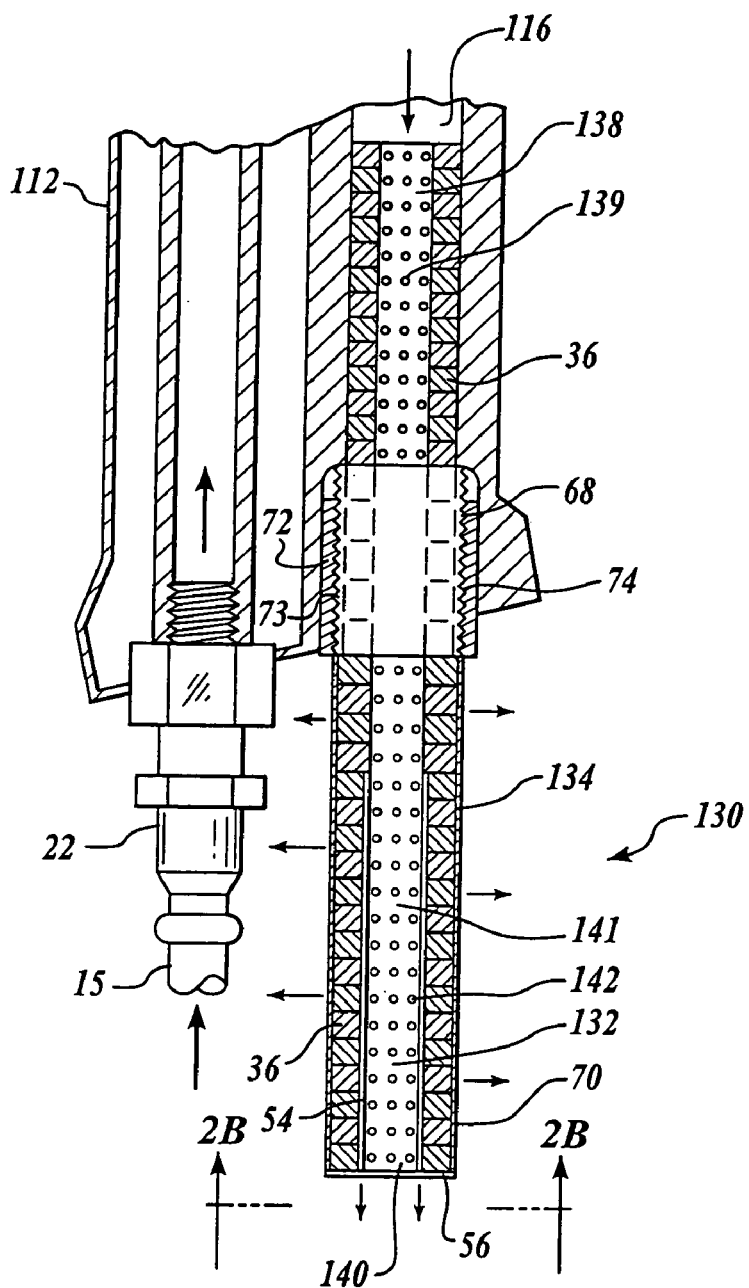
FIG. 2A is a partial cross-sectional side view of a second embodiment of a muffler formed in accordance with the present invention.

As shown in FIG. 1, the washer 36 inner hole diameters are all the same size, and the washer 36 outer diameters are all the same size. In general, a muffler formed in accordance with the present invention may include washers 36 of various inner and outer diameters. For example, the configurations of FIG. 2A shows washers 36 of like outer diameters and varying inner diameters. In addition, the washers 36 may be of varying densities and/or thicknesses. The size, density, and arrangement of the washers 36 will affect the rate at which the exhaust air is slowed, and hence will effect exhaust noise and backpressure. Accordingly, a designer should carefully consider the number, size, density, material, and placement of the washers 36 in the muffler 30.

The combination of washers 36 and inner tube 32 is located within the outer sleeve 34. Referring again to the embodiment of FIG. 1, the outer sleeve 34 is sized to contact the outer surfaces of the washers 36. In some embodiments, the outer sleeve 34 is formed from a lightweight, porous, and flexible fabric. Examples of suitable flexible materials include loose-knit or woven nylon fabric, canvas, polyester, wool, perforated flexible plastic, perforated tape, other synthetic fabrics, perforate sealant, etc. Other embodiments use an outer tube formed from a rigid or semirigid material, e.g., plastic, metal, thick paper, thick foil, etc.

Still referring to FIG. 1, the washers 36 extend along the inner tube 32 between the tube distal end 40 and the inner tube location adjacent the proximal end threads 44. A lower seal or cap 50 closes off the inner tube distal end 40 and the last washer, which is positioned at the distal end 40. An upper seal or cap 50' closes off the end washer near the proximal end 38. Although the caps 50, 50' may be flexible or rigid, they do not allow airflow therethrough in the embodiment of FIG. 1. During use, exhaust air enters the inner tube proximal end 38 from the exhaust passage 16, travels down the inner tube 32 and outward through the inner tube holes 42 and into the washers 36. At the washers 36, the exhaust is slowed and the exhaust noise is consequently reduced. The exhaust air then travels radially out the washers 36 and through the outer sleeve 34 and into the atmosphere. As will be appreciated from viewing FIG. 1, the caps 50, 50' on the first and last washers force the exhaust air to travel radially outward through the washers 36.

Figure 2B:
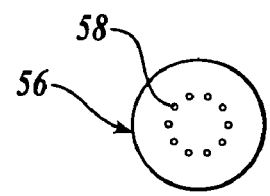
FIG. 2B is a plan view of the end cap shown in FIG. 2A.

Shown in FIGS. 2A and 2B is a second embodiment of a muffler 130, formed in accordance with the present invention. FIG. 2A is also a partial cut-away drawing. At the location of the handle 112 and the muffler 130, the inner tube 132 and the lower end cap 56 and annular member 72 are shown in side view, not in cross-sectional side view. Similar to the first embodiment, the second embodiment also includes an inner tube 132 having proximal end 138 and distal end 140 and a plurality of holes 142 therethrough. The inner tube 132 further includes a first portion 139 and a second portion 141. The first portion 139 is located near the inner tube proximal end 138. The second portion 141 is located near the inner tube distal end 140. The holes 142 are located at least along the length of the inner tube second portion 141. The first portion 139 is surrounded by a plurality of similarly sized, stacked, circular washers 36. The combination of the first portion 139 and its respective washers 36 is positionable within the exhaust passage 116 via the exhaust opening. The outer diameters of these washers 36 are preferably sized to contact the surface of the exhaust passage 116 inside the handle 112.

The second portion 141 is surrounded by washers 36 and an outer sleeve 134. The outer sleeve 134 includes first end 68 and second end 70. The outer sleeve first end 68 is located between the inner tube proximal end 138 and distal end 140. The outer sleeve second end 70 is located near the inner tube distal end 140. The outer sleeve first end 68 is formed as a rigid annular member 72 that includes a threaded outer surface 73. As shown in FIG. 2A, the handle exhaust opening includes mating threads 74 adapted to engage the outer sleeve first end threaded outer surface 73. The mating threads 74 may be formed from a nut that is inserted in the exhaust opening, formed integrally at the exhaust opening during manufacture of the handle 112, formed at the opening after formation of the handle 112, or formed using any other methods available for creating threading. The mating threads 74 of FIG. 2A are provided by a cylindrical nut that is glued, cemented, or heat-welded to an existing handle exhaust opening. What is important to the second embodiment of the present invention is that the nut be securely attached to the handle 112 so that it will not move during use of the hand tool.

Still referring to FIG. 2A, washers 36 of differing densities are arranged alternatingly along the inner tube 132. In addition to density variations, some of the washers along the inner tube second portion 141 have a larger inner diameter than other of the washers. This provides a passage 54 for exhaust air to travel in addition to passage out the washers. The second embodiment muffler 130 includes a perforated lower end cap 56 shown in plan view in FIG. 2B. The perforated lower cap includes a ring of holes 58 positioned to align with the passage 54 during use.

Figure 3A:
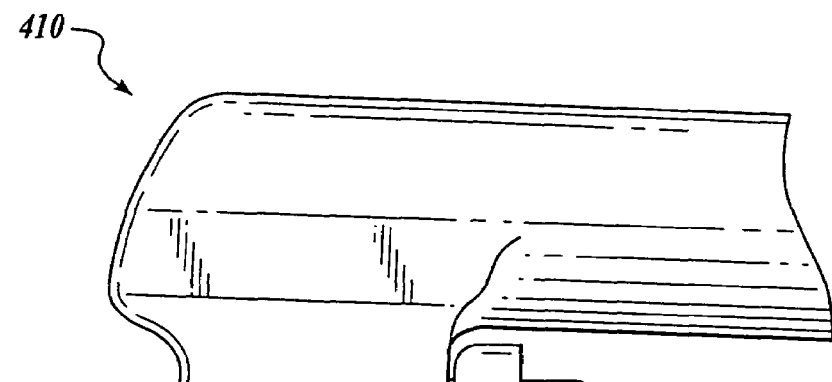
FIG. 3A is partial cross-sectional side view of another embodiment of a muffler formed in accordance with the present invention.
Figure 3B:
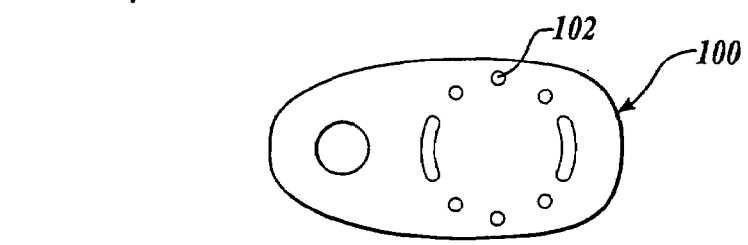
FIG. 3B is a plan view of the end cap taken along lines 6B—6B of FIG. 3A.

Shown in FIGS. 3A and 3B is another embodiment of a muffler 430 formed in accordance with the present invention. The muffler 430 includes an inner tube 432 and a number of washers 36. The inner tube 432 is preferably formed as a spring. FIG. 3A is a partial cutaway drawing. It will be apparent that the inner tube 432 is shown in side view, not in cross-sectional side view. The inner tube 432 is positioned within the area defined by the stacked washer 36 inner holes. When using a spring-shaped inner tube 432, the coil thickness and the number of coils per a given length can be tailored to give a particular desired airflow rate. The spring-shaped inner tube 432 may be in compression, in tension, or otherwise unloaded. What is important to the present invention is the airflow rate ensuing from the inner tube 432—not necessarily the compressive capability of the spring. Therefore, other spring-like shapes may be used.

In the embodiment of FIG. 3A, the combination of washers 36 and inner tube 432 is inserted directly into the air exhaust passage 416. The interior surfaces of the air exhaust passage 416 act as an outer tube. The washers 36 are sized to provide an airflow passage 98 between the peripheral edge surfaces of the washers 36 and the air exhaust passage 416 sidewall surfaces. An end cap 100 is provided to close off the exhaust passage 416 at the handle bottom surface 418. The end cap 100, shown in FIG. 3B, includes one or more openings 102 through which exhaust gas may exit the hand tool 410. It is preferable that the end cap 100 does not include openings that align directly with the inner tube 432 so that exhaust gas will be urged to pass from the inner tube 432 laterally outward through the washers 36 before exiting the hand tool 410. During use, exhaust air passes from the hand tool 410 through the inner tube 432, out the washers 36, and through the passage 98 to the openings 102 in the end cap 100.

Figure 4:
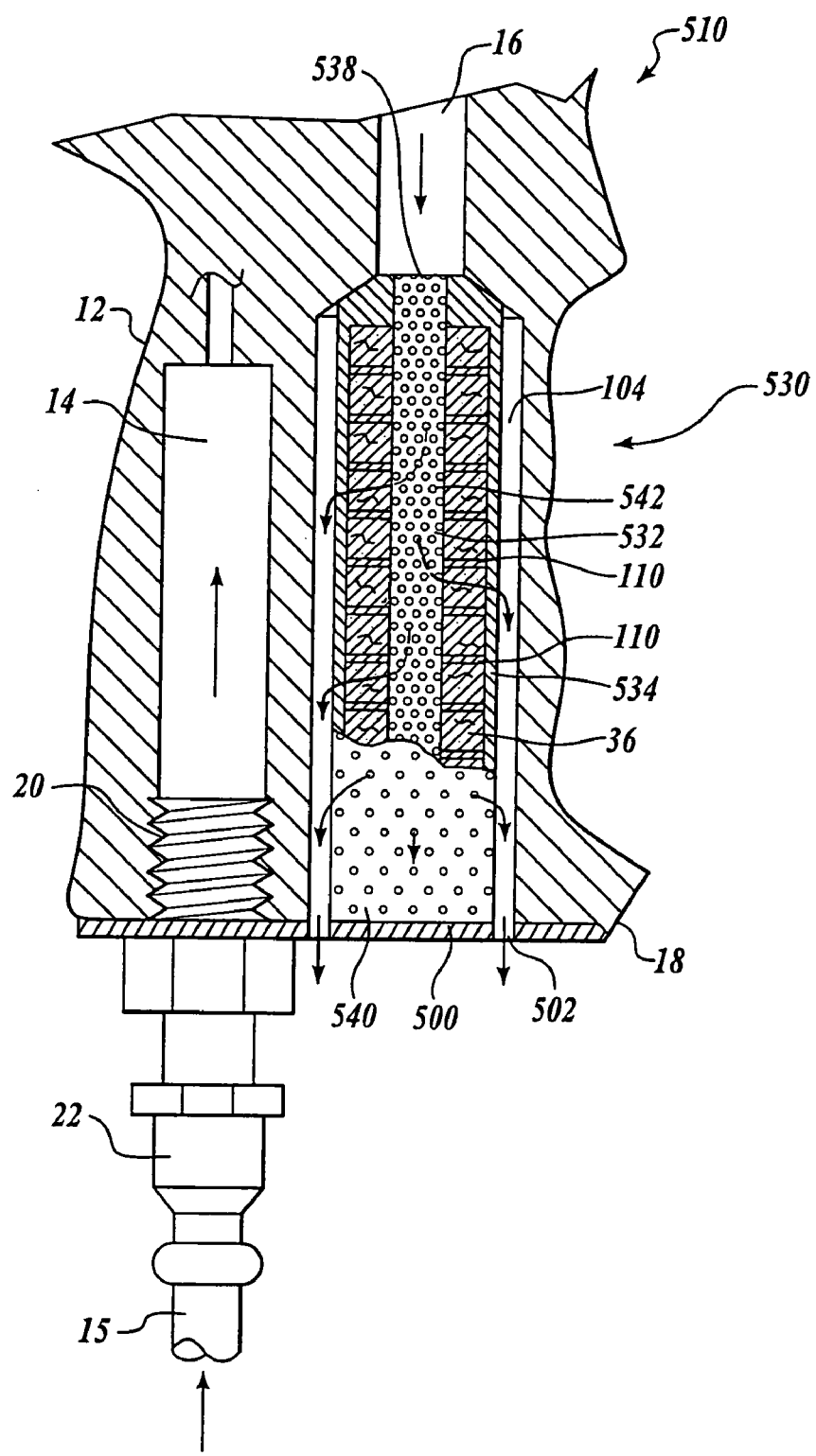
FIG. 4 is a partially cut-away and partially cross-sectional side view of another embodiment of a muffler formed in accordance with the present invention.

Shown in FIG. 4 is another embodiment of a muffler 530 formed in accordance with the present invention. The muffler 530 includes an inner tube 532 having a plurality of holes 542 and a number of washers 36 stacked about the inner tube 532. Individual dividers 110 are located between the washers 36. Each divider 110 includes an inner diameter sized to contact the inner tube 532 and an outer diameter sized to contact the interior surface of the outer sleeve 534. The inner tube 532 is open at its proximal end 538 and closed at its distal end 540. The inner tube 532 and washers 36 are held within an outer sleeve 534 located within the main section 104 of the exhaust passage. The outer sleeve 534 includes a number of airflow openings. The outer sleeve 534 is sized smaller than the main section so that a passage 104 is available for exhaust airflow.

The outer sleeve 534, shown in FIG. 4, is a rigid member formed of a lightweight plastic and having a plurality of holes (not shown) positioned along the entire outer tube length. Other arrangements are possible. As before, what is important to this embodiment of the present invention is that the combination of components provides sufficient filtering and noise dampening without disrupting efficient operation of the tool 510. An end cap 500, similar to the end cap 100 shown in FIG. 3B, is provided across the bottom of the handle 12. The end cap 500 includes a number of openings 502 that, in the embodiment of FIG. 4, are at locations outward of the outer sleeve 534.

In the embodiment of FIG. 4, a cutoff wall (not shown) is located at the distal end of the inner tube. During use, exhaust air is directed from the handle exhaust passage 16 into the open inner tube proximal end 538. The cutoff wall forces exhaust air to flow out the holes 542 of the inner tube 532 and into the adjacent washers 36. The dividers 110 force the exhaust air to travel laterally through each washer 36. The exhaust air exits the muffler via the outer sleeve 534 airflow openings. In this embodiment, the dividers 110 provide a barrier to prohibit exhaust air from moving vertically between washers 36. The exhaust air exits the handle 12 via the end cap 500 openings 502.

Figure 5:
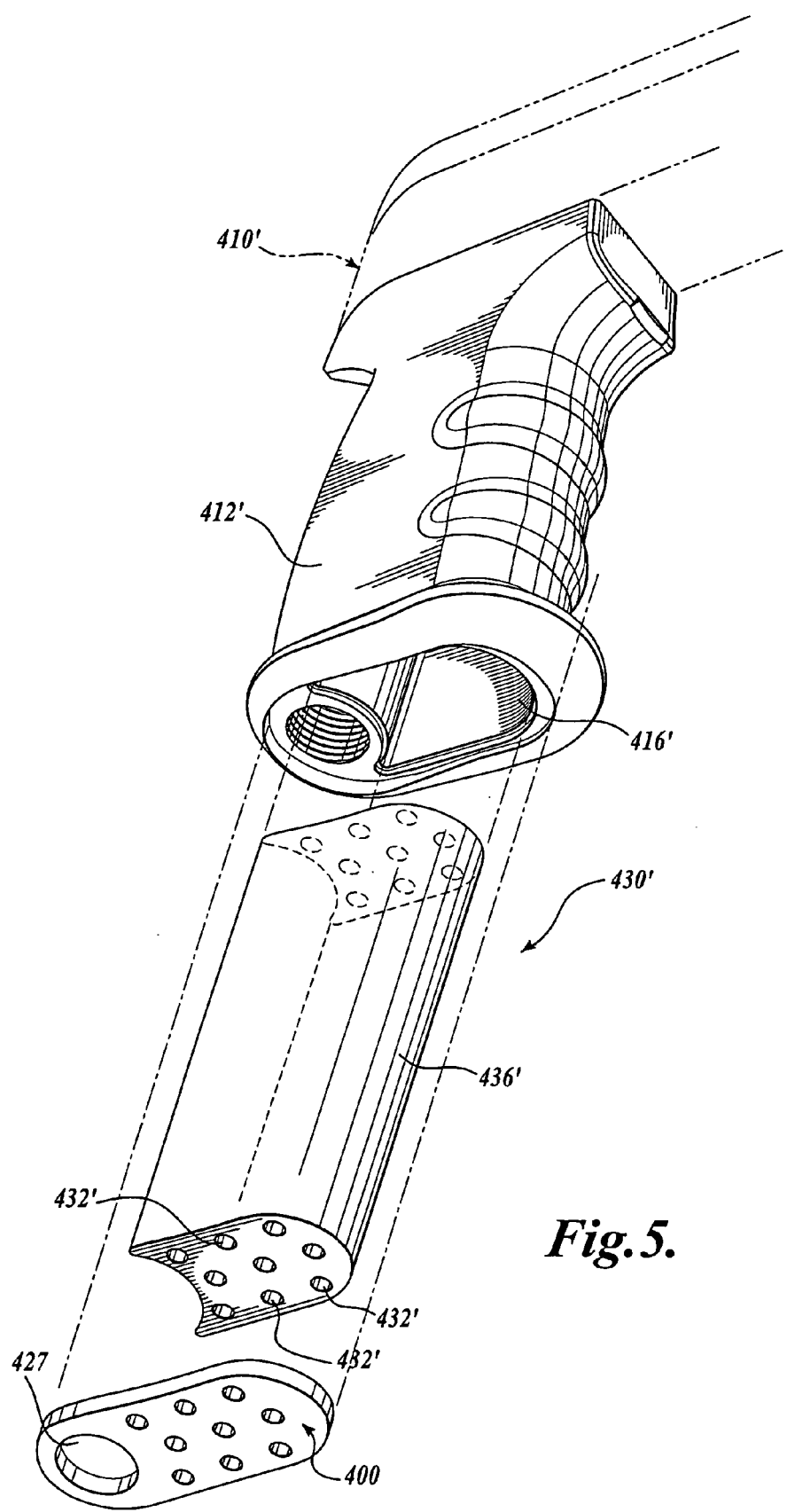
FIG. 5 is a perspective view of another embodiment of a muffler formed in accordance with the present invention, utilizing a rod of sound absorbing material.

FIG. 5 shows another embodiment of a muffler 430' according to the present invention, similar to the muffler 430 shown in FIG. 3A, but wherein a plurality of longitudinal apertures 432' extends through an elongate rod 436' of sound-suppressing material, rather than a single, centrally-disposed aperture defined by the stacked washers 36 (FIG. 3A). The rod 436' is disposed in an exhaust passage 416' in the handle 412' of a hand tool 410'. The rod 436' of sound suppressing material may be made from, for example, felt, gauze, rubber, foam, natural, or synthetic fibrous materials, or the like. The apertures 432' extend generally longitudinally through the rod 436', although they may be inclined or nonlinear therethrough. The rod 436' may be formed as a unitary block of material or may comprise a plurality of stacked elements that cooperatively form the rod 436'. It will also be appreciated that the rod 436' may have a peripheral dimension that is smaller than the inner dimension of the exhaust passage 416' in the handle, thereby also providing a peripheral passageway for the exhaust air.

A perforated cap plate 400 is attached to the handle 412' below the rod 436', holding the rod 436' therein and providing a port for the exhaust to leave the handle.

Figure 6:
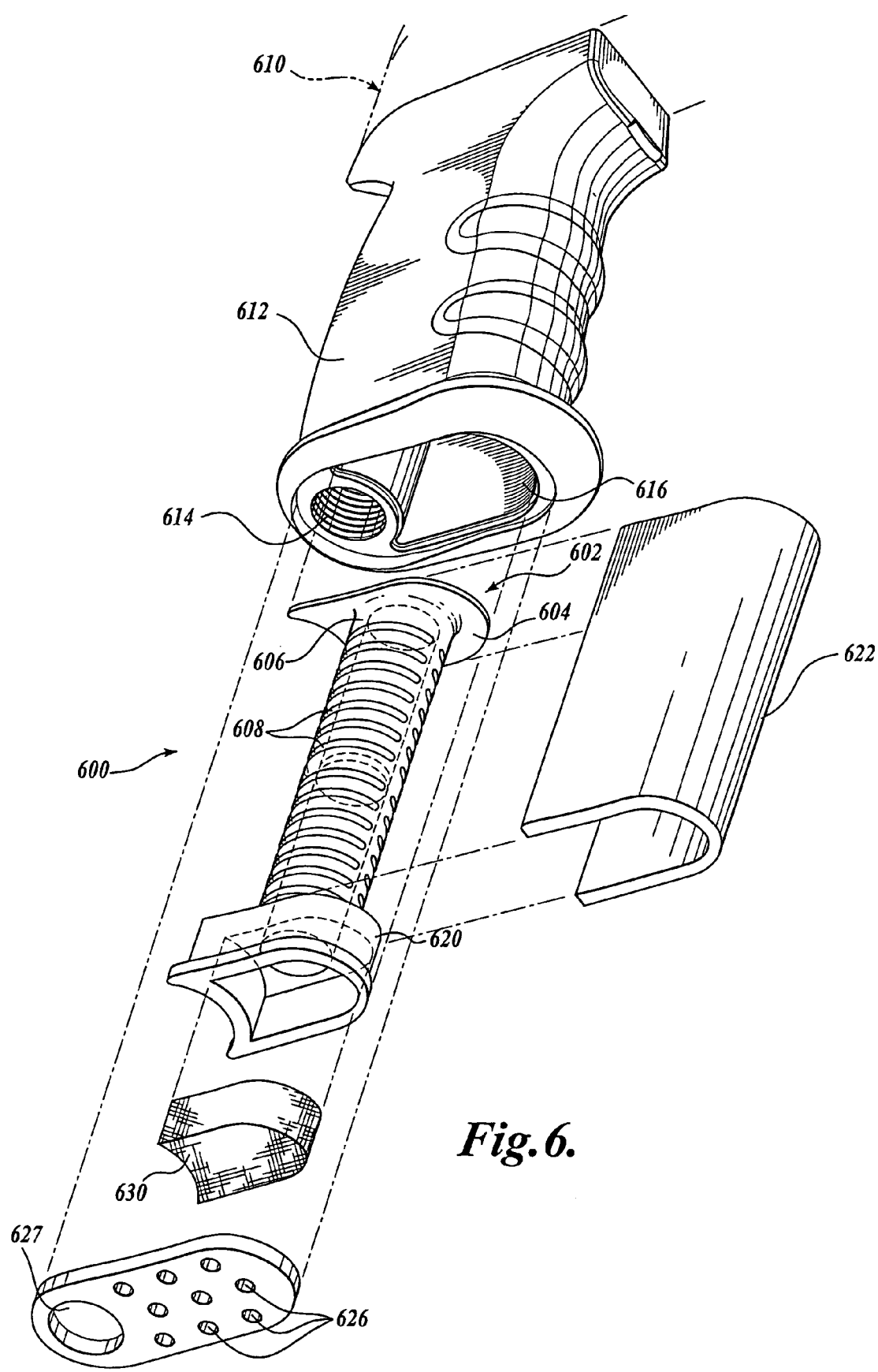
FIG. 6 is a perspective view of yet another embodiment of a muffler formed in accordance with the present invention.

Another embodiment of a muffler assembly 600 according to the present invention is shown in exploded view in FIG. 6, which shows insertion of the muffler assembly 600 into the handle 612 of a power tool 610. The muffler assembly 600 includes a tube member 602 having a proximal flange 604 that is sized and shaped to be slidably inserted into an exhaust passage 616 provided in the handle 612 of the power tool 610. A perforated tubular portion 606 extends downwardly from the flange 604. The perforated tubular portion 606 includes a number of apertures 608 distributed along its length. An oversized, downwardly opening receptacle 620 is disposed at the distal end of the tubular portion 606, the receptacle 620 also sized to be slidably insertable into the exhaust passage 616. A flexible filter panel 622 is generally wrapped about the tubular portion 606 of the tube member 602, and a diffuser panel 630 is inserted into the receptacle 620, as discussed in more detail below.

The proximal flange 604 at the proximal end of the tube member 602 and the receptacle 620 at the distal end of the tube member 602 are preferably sized and shaped to approximately conform to the shape of the exhaust passage 616, such that the tube member 602 slides smoothly into the exhaust passage 616 and is maintained in a desired position therein. The intermediate tubular portion 606, which is smaller in the transverse dimension than the proximal flange 604 and receptacle 620, is thereby positioned generally away from the walls of the exhaust passage 616, providing a space for exhaust airflow and for the filter panel 622.

Figure 7:
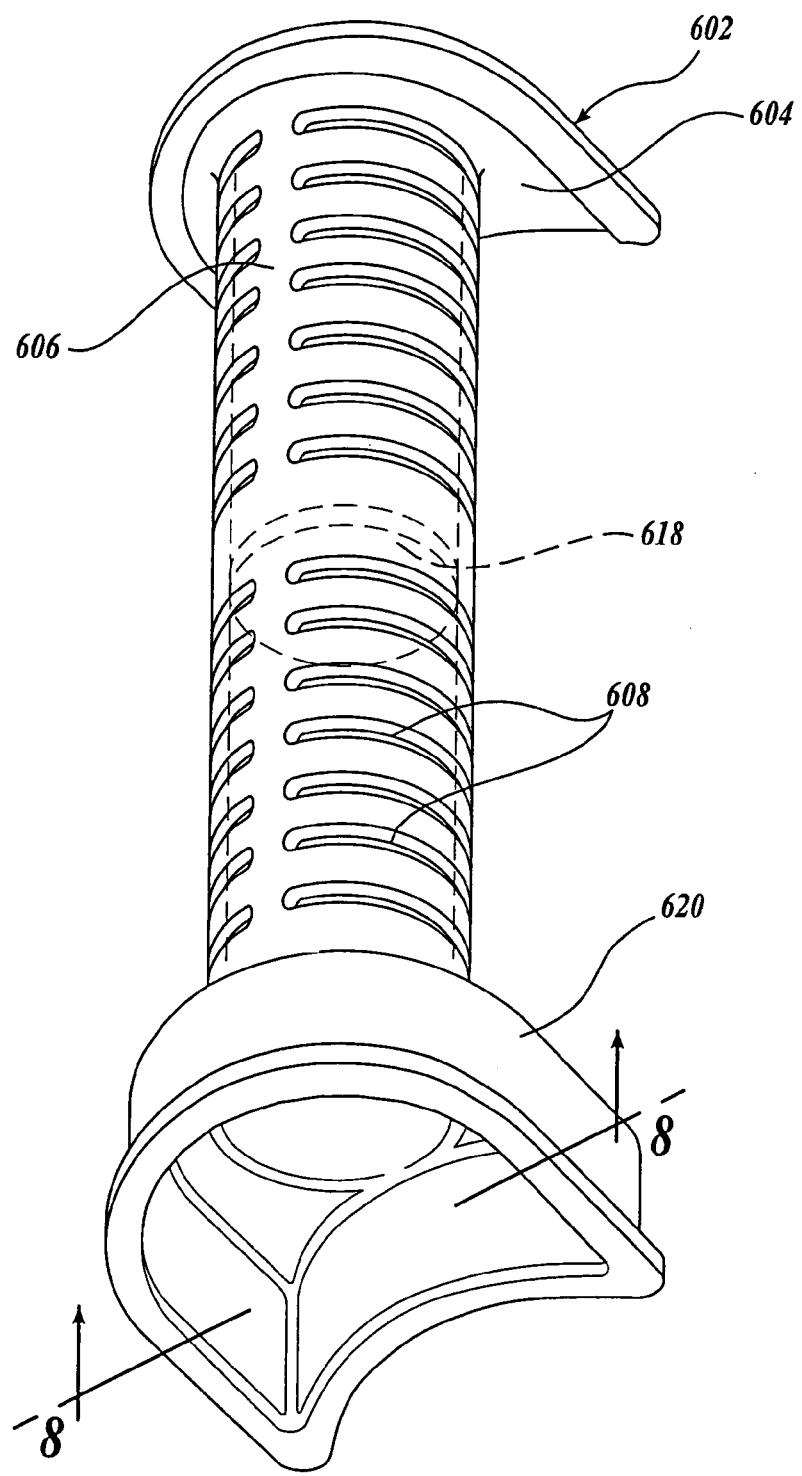
FIG. 7 is a perspective view of the tube member shown in FIG. 6.

The tube member 602 is shown in isolation in FIG. 7. In the currently preferred embodiment, the tube member 602 is formed integrally from a semirigid polymeric material, although other suitable materials may be used, including, for example, relatively soft metals, composite materials, or the like. Although the apertures 608 in the tubular portion 606 shown in FIGS. 6 and 7 are elongate circumferential apertures, it is contemplated by the present invention that the apertures 608 could be alternatively shaped and/or orientated. For example, the apertures may alternatively be round apertures, elongate, longitudinally oriented apertures, or the like.

The flexible, sound-dampening and/or air-filtering panel 622 may be formed from any suitable porous filter material, including, for example, felt, gauze, foam, fiber, synthetics, etc. The filter panel 622 is selected of a density and composition sufficient to dampen noise in the exhaust flow, while also being sufficiently porous that the exhaust air can pass therethrough without unduly increasing backpressure in the power tool 610 during use. The filter panel 622 is disposed about the tubular portion 606 of the tube member 602, between the proximal flange 604 and the receptacle 620.

In the preferred embodiment the filter panel 622 is between about one-eighth inch and about one-half inch in thickness and is flexible, such that the panel 622 may be conveniently wrapped around the tubular portion 606 and does not extend significantly beyond the proximal flange 604. The panel 622 may be attached to the tubular portion 606 in any convenient manner—for example, by selective application of an adhesive, a latching mechanism (not shown) disposed on the panel 622 (such as a hook-and-loop material), or a separate strap, string, wire, or tape (not shown) that wraps around the panel 622. Alternatively, the panel 622 may be formed having a generally C-shaped cross-section, and having sufficient stiffness to retain itself on the tube member 602. It will be appreciated that the panel 622 may alternatively be wrapped about the tubular portion 606 without fastening and inserted into the exhaust passage 616, such that the exhaust passage cooperatively retains the panel 622 in the desired position.

The diffuser panel 630 is sized and shaped to be slidably inserted into the receptacle 620, the diffuser panel being made from a relatively porous material, such as a spacer fabric or similar porous material. The diffuser panel 630 provides additional sound dampening just prior to the exhaust air exiting the exhaust passage 616.

Figure 8:
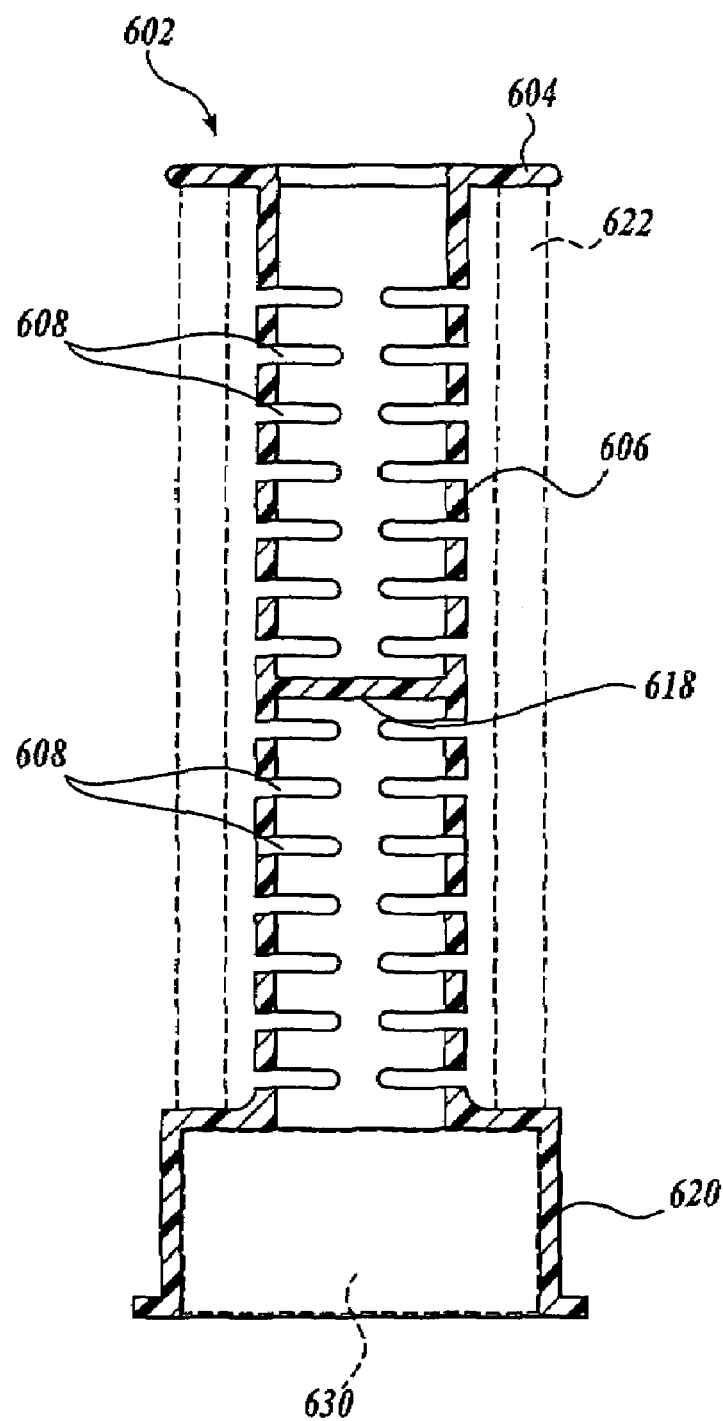
FIG. 8 is a cross-sectional view through line 8—8 of the tube member shown in FIG. 7.

FIG. 8 shows a cross-sectional side view of the tube member 602 with the filter panel 622 and diffuser panel 630 shown in phantom. In this preferred embodiment, the tubular portion 606 of the tube member 602 includes an optional blocking panel 618 disposed between the proximal and distal ends of the tube member 602 (also shown in hidden line in FIG. 7). The blocking panel 618 may be formed integrally with the tube member 602 (as shown) or formed separately—for example, by inserting a blocking member into the tubular portion 606. Although the blocking panel 618 is shown as a solid blocking member, it is contemplated that the blocking panel might alternatively include one or more apertures therethrough (not shown). It is also contemplated that more than one blocking panel 618 may be provided in the tubular portion 606.

The muffler assembly 600 is assembled as shown in FIG. 6 and inserted into the exhaust passage 616 of the handle 612, and an end cap 624 having one or more apertures 626 is secured over the exhaust passage 616 exit, to releasably secure the muffler assembly 600 therein. It is contemplated that the end cap 624 may be attached by any suitable mechanism—for example, with a threaded member (not shown) or slidably in a slot (not shown) formed in the handle 612, or the like. In the illustrated embodiment, the end cap 624 also includes an aperture 627 disposed over the inlet passage 614 opening to accommodate a coupling to a compressed air source (not shown).

It will now be appreciated that the muffler assembly 600 is adapted to receive at least most of the exhaust air from the power tool 610, which is directed into the tubular portion 606 of the tube member 602 by the proximal flange 604. In the preferred embodiment, the blocking panel 618 redirects some or all of the entering exhaust air laterally through the apertures 608 above the blocking panel 618 in the tubular portion 606 and through the filter panel 622. The receptacle 620, cooperatively with the exhaust passage 614, then redirects the exhaust air through the apertures 608 below the blocking panel 618 back into the tubular portion 606. The exhaust air then passes through the diffuser panel 630 and exits the handle 612 through the apertures 626 in the end cap 624.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A pneumatic hand tool comprising:
   a handle portion with an exhaust passage including an elongate channel with an open end;
   a tube member sized to be insertable into the exhaust passage through the open end, the tube member having a proximal flange, an intermediate tubular portion with a plurality of apertures therethrough, and a distal end defining a receptacle;

a first porous panel disposed about the intermediate tubular portion of the tube member over the plurality of apertures;

a second porous panel disposed in the receptacle; and an end cap having at least one aperture therethrough, the end cap being removably attached to the handle portion such that the tube member is retained in the exhaust passage.

2. The pneumatic hand tool of claim 1, wherein the tubular portion of the tube member further includes a transverse blocking plate disposed in the tubular portion of the tube member.

3. The pneumatic hand tool of claim 2, wherein the first porous panel is a flexible sheet that is wrapped around the perforated portion of the tube.

4. The pneumatic hand tool of claim 3, wherein the first porous panel is made of felt.

5. The pneumatic hand tool of claim 1, wherein the tube member is formed integrally from a semirigid polymeric material.

6. The pneumatic hand tool of claim 1, wherein the apertures through the tubular portion of the tube member are elongate circumferential apertures.

7. The pneumatic hand tool of claim 1, wherein the first porous panel is attached to the tubular portion of the tube member.

8. The pneumatic hand tool of claim 1, wherein the first porous panel is generally C-shaped in cross-section and has sufficient stiffness to retain itself on the tubular portion of the tube member.

9. The pneumatic hand tool of claim 1, wherein the second porous panel is formed from a spacer fabric.

10. The pneumatic hand tool of claim 1, wherein the second porous panel is removably insertable into the receptacle.

11. The pneumatic hand tool of claim 1, wherein the tube member flange and the tube member receptacle have a larger transverse dimension than the tubular portion, such that a flow path is formed between the tubular portion and a wall of the exhaust passage.

12. A muffler assembly for a pneumatic hand tool, the muffler assembly comprising:

a tube member having an upper flange, a perforated tubular portion defining a flow channel therethrough, and a receptacle;

a filter panel wrapped about the perforated tubular portion; and a diffuser panel disposed in the receptacle;

wherein the tube member, filter panel, and diffuser panel are adapted to be removably retained in an exhaust passage of a pneumatic hand tool.

13. The muffler assembly of claim 12, wherein the filter panel comprises a sheet of felt.

14. The muffler assembly of claim 12, wherein the perforated tubular portion of the tube member further includes a transverse plate blocking the channel defined by the perforated tubular portion.

15. The muffler assembly of claim 12, wherein the filter panel is a flexible sheet that is wrapped around the perforated tubular portion.

16. The muffler assembly of claim 12, wherein the tube member is formed integrally from a semirigid polymeric material.

17. The muffler assembly of claim 12, wherein perforated tubular portion includes a plurality of elongate circumferential apertures.

18. The muffler assembly of claim 12, wherein the filter panel is attached to the perforated tubular portion of the tube member.

19. The muffler assembly of claim 12, wherein the diffuser panel is formed from a spacer fabric.

20. The muffler assembly of claim 12, wherein the diffuser panel is removably insertable into the receptacle.

21. The muffler assembly of claim 12, wherein the tube member flange and the tube member receptacle have a larger transverse dimension than the perforated tubular portion, such that a flow path is formed between the perforated tubular portion and a wall of the exhaust passage.

* * * * *